United States Patent
Kim et al.

(10) Patent No.: US 9,183,382 B2
(45) Date of Patent: Nov. 10, 2015

(54) METHOD FOR BLOCKING A DENIAL-OF-SERVICE ATTACK

(75) Inventors: Byoung-Koo Kim, Daejeon (KR); Seung-Yong Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 53 days.

(21) Appl. No.: 13/992,527

(22) PCT Filed: Dec. 14, 2011

(86) PCT No.: PCT/KR2011/009619
§ 371 (c)(1),
(2), (4) Date: Jun. 7, 2013

(87) PCT Pub. No.: WO2012/081903
PCT Pub. Date: Jun. 21, 2012

(65) Prior Publication Data
US 2013/0263268 A1    Oct. 3, 2013

(30) Foreign Application Priority Data
Dec. 14, 2010  (KR) .................. 10-2010-0127821

(51) Int. Cl.
*H04L 29/06* (2006.01)
*G06F 21/55* (2013.01)

(52) U.S. Cl.
CPC ............ *G06F 21/55* (2013.01); *H04L 63/1458* (2013.01)

(58) Field of Classification Search
None
See application file for complete search history.

(56) References Cited

U.S. PATENT DOCUMENTS

| | | | | |
|---|---|---|---|---|
| 7,215,637 B1* | 5/2007 | Ferguson et al. | .......... | 370/230.1 |
| 7,650,635 B2* | 1/2010 | Khare et al. | .......... | 726/13 |
| 7,681,235 B2* | 3/2010 | Chesla et al. | .......... | 726/23 |
| 7,992,192 B2* | 8/2011 | Maher et al. | .......... | 726/3 |
| 8,615,582 B2* | 12/2013 | McClure et al. | .......... | 709/224 |
| 8,726,382 B2* | 5/2014 | Knapp et al. | .......... | 726/23 |
| 2004/0015728 A1* | 1/2004 | Cole et al. | .......... | 713/201 |
| 2005/0125195 A1* | 6/2005 | Brendel | .......... | 702/182 |
| 2006/0098585 A1 | 5/2006 | Singh et al. | | |
| 2010/0154049 A1* | 6/2010 | Yoshimi et al. | .......... | 726/13 |
| 2014/0115706 A1* | 4/2014 | Silva et al. | .......... | 726/23 |
| 2014/0157405 A1* | 6/2014 | Joll et al. | .......... | 726/22 |

FOREIGN PATENT DOCUMENTS

KR   1020030049288 A   6/2003
KR   1020030094839 A   12/2003

OTHER PUBLICATIONS

Braden, "Requirements for Internet Hosts—Communication Layers", Oct. 1989, Network Working Group Request for Comments: 1122, p. 1-116.*

* cited by examiner

*Primary Examiner* — Christopher Revak
(74) *Attorney, Agent, or Firm* — Rabin & Berdo, P.C.

(57) ABSTRACT

A server receives a first echo request message which complies with an Internet control message protocol, extracts filtering information from hear information of the received first echo request message, and when a second echo request message which complies with the Internet control message protocol is received, compares header information of the received second echo request message and the extracted filtering information so as to determine whether to block an attacking packet for the received second echo request message. According to the present invention, the server blocks the attacking packet using the Internet control message protocol, thereby blocking a denial-of-service attack.

9 Claims, 23 Drawing Sheets

METHOD FOR BLOCKING A DENIAL-OF-SERVICE ATTACK

TECHNICAL FIELD

The present invention relates to a method for blocking a denial-of-service attack. More particularly, the present invention relates to a method for blocking a denial-or-service attack by an Internet control message protocol (ICMP) flooding.

This application claims the priority benefit of Korean Patent Application No. 10-2010-0127821, filed on Dec. 14, 2010, in the Korean Intellectual Property Office, the disclosure of which is incorporated herein by reference.

BACKGROUND ART

A denial-of-service (DoS) attack, hereinafter referred to as "DoS attack", may diminish availability of a network or a server with respect to a website, a domain name server, and the like. More particularly, a distributed denial of service (DDoS) attack, hereinafter referred to as "DDoS attack", may refer to a method for simultaneously performing a DoS attack in multiple zombie computers contaminated by malicious viruses.

Here, an Internet control message protocol (ICMP) may provide information on an error status and a status change between hosts, or between a host and a router, provide a function for responding to a request, and may not require an activated service or a port.

In this instance, an ICMP flooding during the DDoS attack may be performed in a manner in which a large volume of ICMP packets are transferred to a target of an attack, abusing characteristics of the ICMP.

However, conventional schemes for detecting and responding to an attack may have an issue in distinguishing an action of a normal user and an action of a malicious user, and indiscriminately blocking by measuring a traffic may lead to blocking of normal user traffic. Accordingly, there is a need for a scheme for selectively blocking only an attacking traffic by a malicious user while protecting a traffic of a normal user.

DISCLOSURE OF INVENTION

Technical Goals

In order to solve the aforementioned issues of the conventional schemes, an aspect of the present invention provides a method for blocking a denial-of-service (DoS) attack, and more particularly, an Internet control message protocol (ICMP) flooding attack, based on a characteristic of a plurality of attacking traffic types.

Technical Solutions

According to an aspect of the present invention, there is provided a method for blocking a denial-of-service (DoS) attack by a server that blocks an attacking packet, using an Internet control message protocol (ICMP), the method including receiving a first echo request message compliant with the ICMP, extracting filtering information from header information of the received first echo request message, receiving a second echo request message compliant with the ICMP, and comparing header information of the second echo request message to the filtering information, and determining whether the received second echo request message is an attacking packet.

According to an aspect of the present invention, there is provided a method for blocking a denial-of-service attack by a server that blocks an attacking packet, using an Internet control message protocol (ICMP), the method including extracting a suspicious packet from among a plurality of packets, using header information of the plurality of packets received, extracting filtering information from header information of the suspicious packet, receiving a message compliant with the ICMP, and comparing the filtering information to header information of the message, and determining whether the message is an attacking packet.

Effects of Invention

According to an aspect of the present invention, it is possible to classify a type of attack of an Internet control message protocol (ICMP) flooding, and to provide a scheme for detecting and blocking an attacking packet based on a characteristic of a plurality of types, such that a smooth network service may be provided to a normal user by blocking an action of a malicious user with respect to various types of ICMP flooding.

BEST MODE FOR CARRYING OUT THE INVENTION

Figure 1:
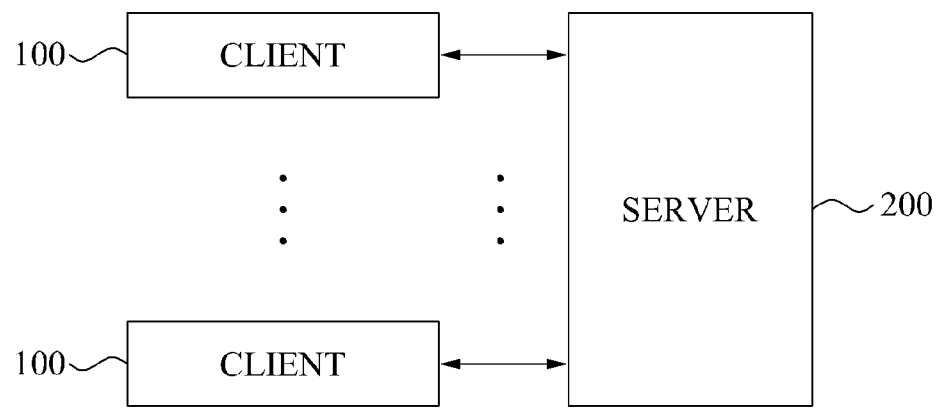
FIG. 1 is a diagram illustrating a configuration of a client-server system according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Referring to FIG. 1, a client-server system according to an embodiment of the present invention is described.

FIG. 1 is a diagram illustrating a configuration of a client-server system according to an embodiment of the present invention.

As shown in FIG. 1, the client-server system may include a plurality of clients 100 and a server 200.

The plurality of clients 100 may request the server 200 for a main operation or information through being connected to the server 200, and receive a result.

The server 200 may return a result of the operation or the information requested by the plurality of clients 100.

Figure 2:
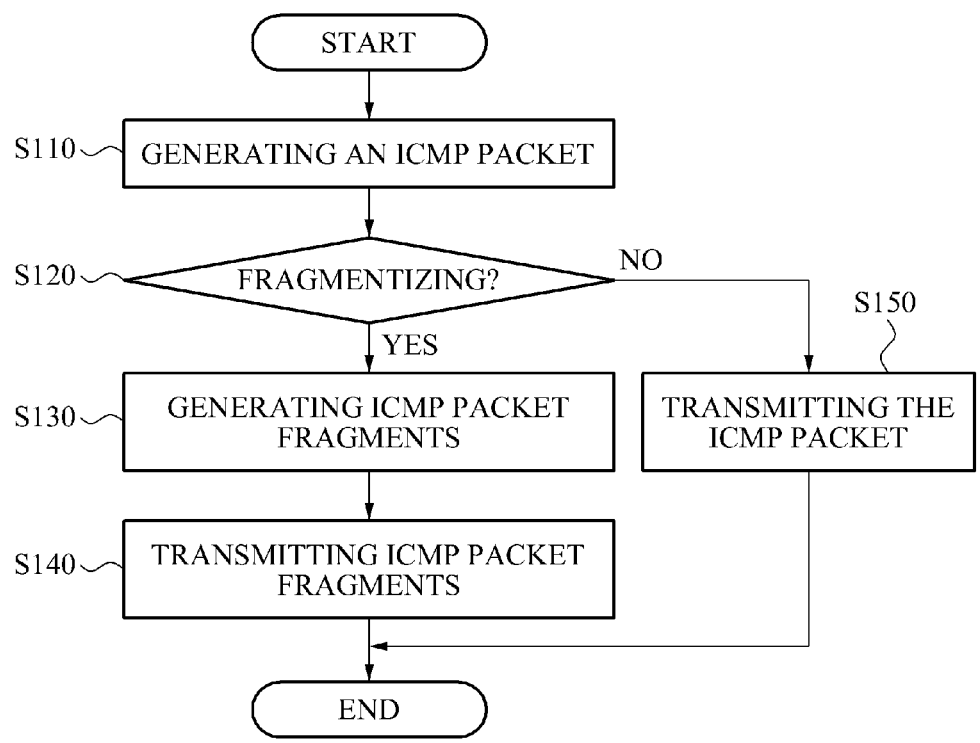
FIG. 2 is a diagram illustrating a method for transmitting an attacking packet according to a first embodiment of the present invention.

Referring to FIG. 2, a method for performing a denial-of service (DoS) attack with respect to a server, through a client transmitting an attacking packet to a server will be discussed.

FIG. 2 is a diagram illustrating a method for transmitting an attacking packet according to a first embodiment of the present invention.

As shown in FIG. 2, in operation S110, the plurality of clients 100 may generate an Internet control message protocol (ICMP) packet corresponding to an attacking packet for performing a DoS attack with respect to the server 200. Here, the ICMP packet may include an Internet protocol (IP) header, an ICMP header, and a payload.

In this instance, the payload may be configured by identical characters, or predetermined characters.

In operation S120, the plurality of clients 100 may determine whether the ICMP packet is fragmented based on a length of the ICMP packet generated.

In operation S130, when the ICMP packet is fragmented, the plurality of clients 100 may partition the payload of the ICMP packet, and generate an ICMP packet fragmented from the ICMP packet, for example, a plurality of ICMP packet fragments. Here, the plurality of ICMP packet fragments may include an IP header and a payload, and a first ICMP packet fragment from among the plurality of ICMP packet fragments may further include an ICMP header.

In operation S140, the plurality of clients 100 may transmit, to the server 200, the plurality of ICMP packet fragments generated.

In operation S150, when the ICMP packet fails to be fragmented, the plurality of clients 100 may transmit the ICMP packet to the server 200.

Figure 3:
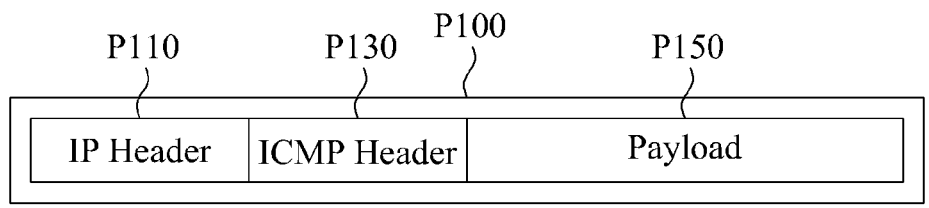
FIG. 3 is a diagram illustrating a structure of an Internet control message protocol (ICMP) packet according to an embodiment of the present invention.
Figure 4:
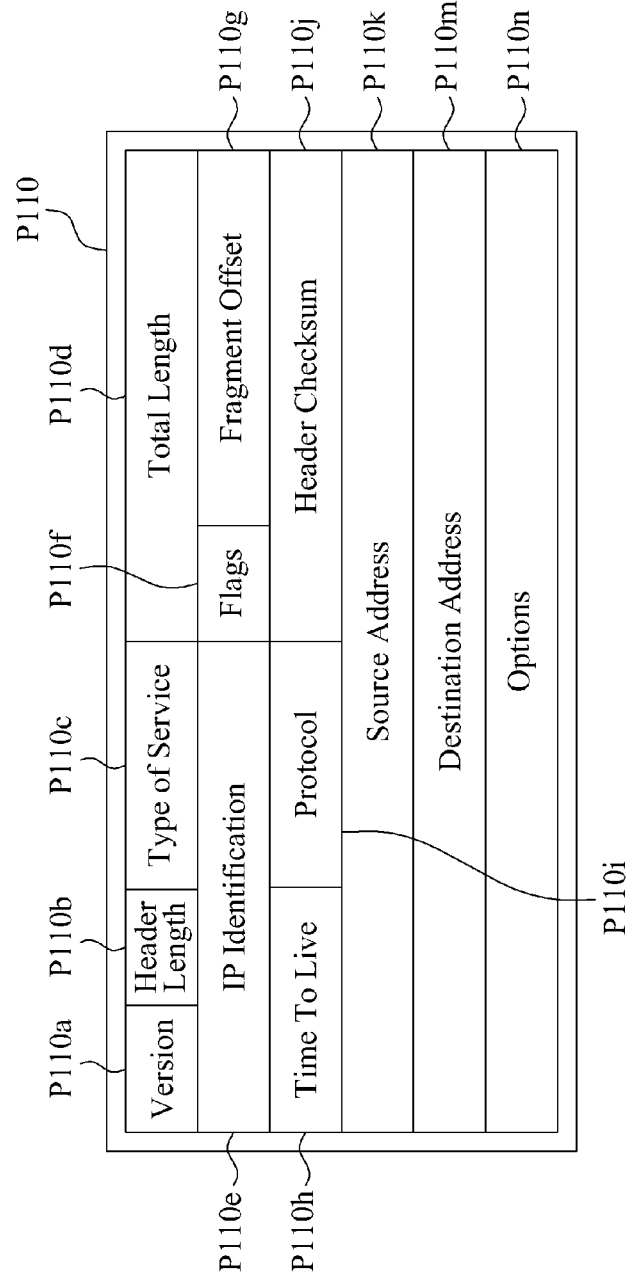
FIG. 4 is a diagram illustrating a structure of an identification (ID) header included in an ICMP packet according to an embodiment of the present invention.
Figure 5:
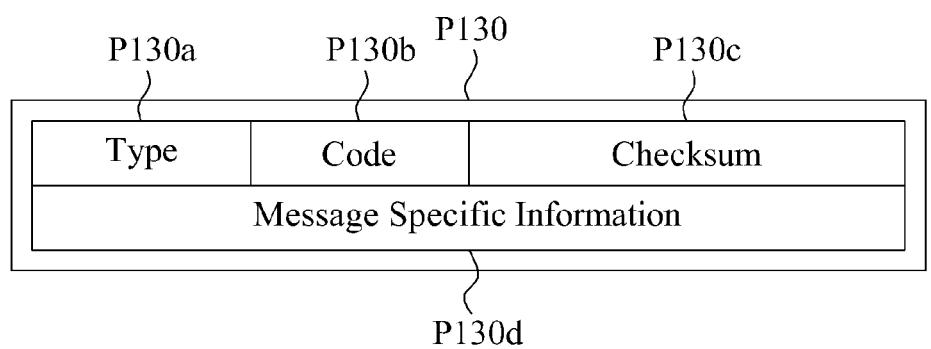
FIG. 5 is a diagram illustrating a structure of an ICMP header included in an to ICMP packet according to an embodiment of the present invention.

Referring to FIGS. 3 to 5, an ICMP packet P100 will be described.

FIG. 3 is a diagram illustrating a structure of the ICMP packet P100 according to an embodiment of the present invention.

As shown in FIG. 3, the ICMP packet P100 may include an IP header P110, an ICMP header P130, and a payload P150.

The IP header P110 may include control information associated with an IP.

The ICMP header P130 may include control information associated with an ICMP.

The payload P150 may include data.

FIG. 4 is a diagram illustrating a structure of the IP header P110 included in an ICMP packet according to an embodiment of the present invention.

As shown in FIG. 4, the IP header P110 may include an IP version field P110a, a header length field P110b, a type of service field P110c, a total length of packet field to P110d, an IP identification field P110e, a flags field P110f, a fragment offset field P110g, a packet time to live field P110h, a protocol identification field P110i, a header checksum P110j, a source address field P110k, a destination address field P110m, and an options field P110n.

The IP version field P110a may include a field value representing IP version information of a corresponding packet.

The header length field P110b may include a field value representing length information of the IP header P110.

The type of service field P110c may include a field value representing service quality information.

The total length of packet field P110d may include a field value representing length information of a corresponding packet.

The IP identification field P110e may include a field value representing IP identification information of a corresponding packet.

The flags field P110f may include a field value representing a fragmentation characteristic of a corresponding packet. Here, the flags field P110f may include a field value, for example, "0x2", representing that a corresponding packet is a final packet.

The fragment offset field P110g may include a field value representing a fragmentation location of a corresponding packet. Here, the fragment offset field P110g may include a field value, for example, "0", representing a corresponding packet as a first packet.

The packet time to live field P110h may include a field value representing a packet time to live for determining whether a corresponding packet is to be discarded.

The protocol identification field P100i may include a field value representing protocol information of a corresponding field. Here, the protocol identification field P110i may include a field value, for example, "0x01", representing an ICMP.

The header checksum field P110*j* may include a field value representing checksum for detecting an error with respect to the IP header P110.

The source address field P110*k* may include a field value representing an IP address of a source of a corresponding packet.

The destination address field P110*m* may include a field value representing an to IP address of a destination of a corresponding packet.

The options field P110*n* may include a field value representing an option of the IP header P110.

FIG. 5 is a diagram illustrating a structure of an ICMP header P130 included in an ICMP packet according to an embodiment of the present invention.

As shown in FIG. 5, the ICMP header P130 may include a type field P130*a*, a code field P130*b*, a checksum field P130*c*, and a message specific information field P130*d*.

The type field P130*a* may include a field value representing a message type of a corresponding packet.

The code field P130*b* may include a field value representing detailed information about a message type of a corresponding packet.

The checksum field P130*c* may include a field value representing checksum for detecting an error with respect to the ICMP header P130.

The message specific information field P130*d* may include a field value representing detailed information about a corresponding packet.

Figure 6:
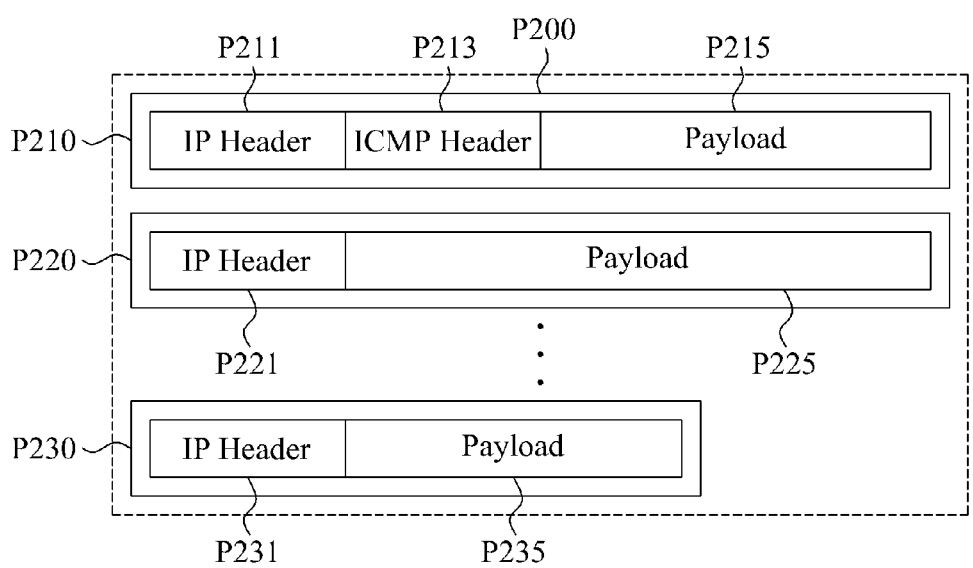
FIG. 6 is a diagram illustrating a structure of a fragmented ICMP packet according to an embodiment of the present invention.
Figure 7:
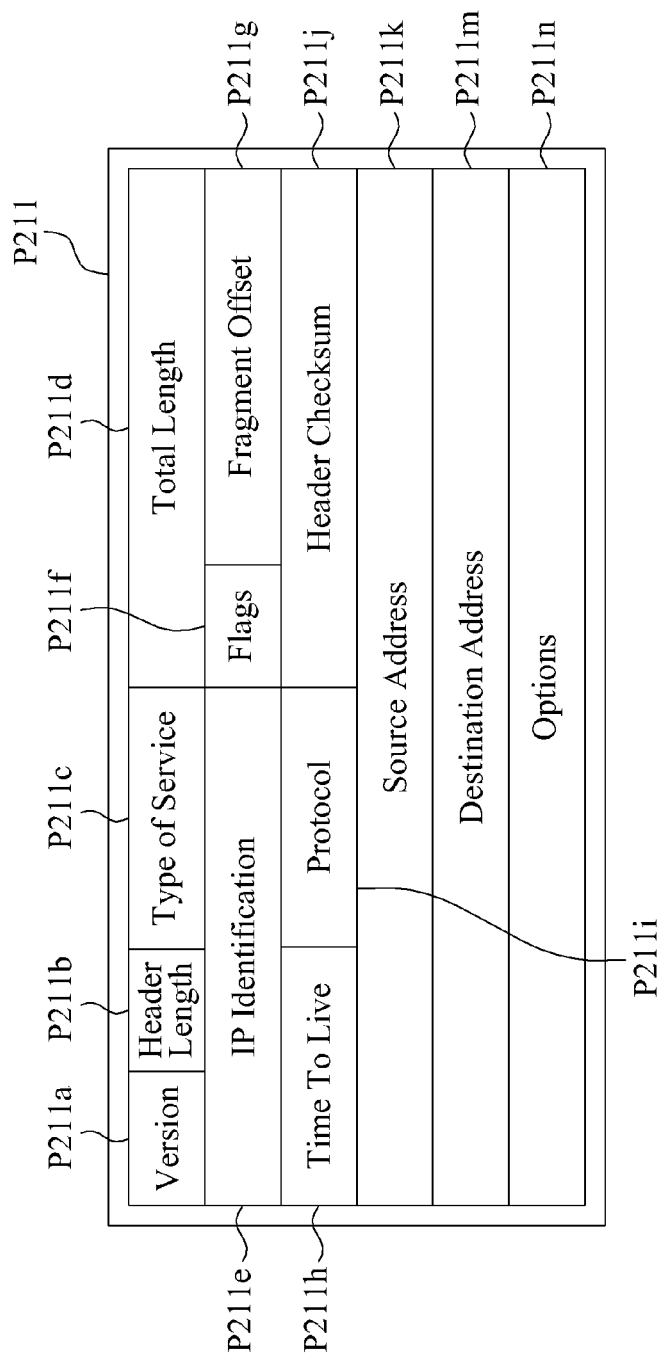
FIG. 7 is a diagram illustrating a structure of an IP header included in an ICMP packet fragment according to an embodiment of the present invention.
Figure 8:
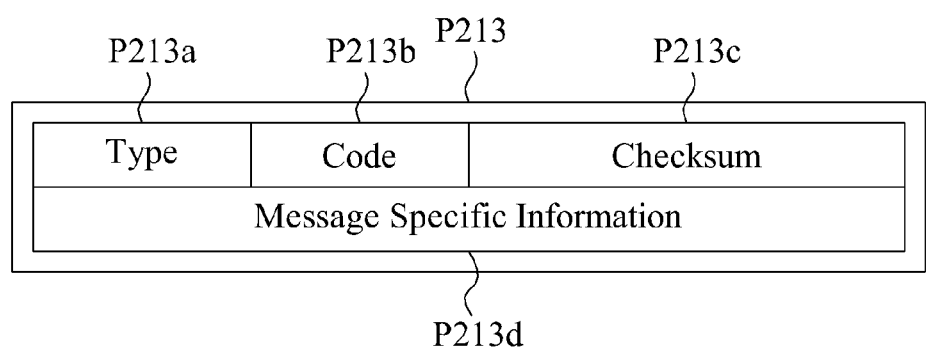
FIG. 8 is a diagram illustrating a structure of an ICMP header included in an ICMP packet fragment according to an embodiment of the present invention.

Referring to FIGS. 6 to 8, a fragmented ICMP packet will be described.

FIG. 6 is a diagram illustrating a structure of a fragmented ICMP packet P200 according to an embodiment of the present invention.

As shown in FIG. 6, the fragmented ICMP packet P200 may include a plurality of ICMP packet fragments. Here, the fragmented ICMP packet P200 may include a first ICMP packet fragment P210, a second ICMP packet fragment P220, and a third ICMP packet fragment P230.

The first ICMP packet fragment P210 may refer to a first packet fragment of the fragmented ICMP packet P200, and may include an IP header P211, an ICMP header P213, and a payload P215.

The second ICMP packet fragment P220 may refer to a second packet fragment of the fragmented ICMP packet P200, and may include an IP header P221, and a payload P225.

The third ICMP packet fragment P210 may refer to a final packet fragment of the fragmented ICMP packet P200, and may include an IP header P231, an ICMP header P231, and a payload P235.

FIG. 7 is a diagram illustrating a structure of an IP header included in an ICMP packet fragment according to an embodiment of the present invention.

Here, the IP header P211 of the first ICMP packet fragment P210 from among the plurality of ICMP packet fragments will be discussed in FIG. 7 because the IP header included in a plurality of ICMP packet fragments included in the fragmented ICMP packet P200 may have an identical structure.

As shown in FIG. 7, the IP header P211 of the first ICMP packet fragment P210 may include an IP version field P211*a*, a header length field P211*b*, a type of service field P211*c*, a total length of packet field P211*d*, an IP identification field P211*e*, a flags field P211*f*, a fragment offset field P211*g*, a packet time to live field P211*h*, a protocol identification field P211*i*, a header checksum P211*j*, a source address field P211*k*, a destination address field P211*m*, and an options field P211*n*.

The IP version field P211*a* may include a field value representing IP version information of a corresponding packet.

The header length P211*b* may include a field value representing length information of the IP header P211.

The type of service field P211*c* may include a field value representing service quality information.

The total length of packet field P211*d* may include a field value representing length information of a corresponding packet.

The IP identification field P211*e* may include a field value representing IP identification information of a corresponding packet.

The flags field P211*f* may include a field value representing fragmentation characteristic information of a corresponding packet. Here, the flags field P211*f* included in the IP header P211 and the IP header P221 may include a field value, for example, "0x1", representing that a corresponding packet fragment is not a final packet. Also, the flags field P211*f* included in the IP header P231 may include a field value, for example, "0x2", representing that a corresponding packet fragment is a final packet.

The fragment offset field P211*g* may include a field value representing fragmentation location information of a corresponding packet. Here, the fragment offset field P211*g* may include a field value, for example, "0", representing that a corresponding packet is a first packet.

The packet time to live field P211*h* may include a field value representing a packet time to live for determining whether a corresponding packet is to be discarded.

The protocol identification field P211*i* may include a field value representing protocol information of a corresponding packet. Here, the protocol identification field P211*i* may include a field value, for example, "0x01", representing an ICMP.

The header checksum field P211*j* may include a field value representing checksum for detecting an error with respect to the IP header P211.

The source address field P211*k* may include a field value representing an IP address of a source of a corresponding packet.

The destination address field P211*m* may include a field value representing an IP address of a destination of a corresponding packet.

The options field P211*n* may include a field value representing an option of the IP header P211.

FIG. 8 is a diagram illustrating a structure of an ICMP header included in an ICMP packet fragment according to an embodiment of the present invention.

As shown in FIG. 8, the ICMP header P213 of the first ICMP packet fragment P210 may include a type field P213*a*, a code field P213*b*, a checksum field P213*c*, and a message specific information field P213*d*.

The type field P213*a* may include a field value representing a type of message of a corresponding packet fragment.

The code field P213*b* may include a field value representing specific information about a type of message of a corresponding packet fragment.

The checksum field P213*c* may include a field value representing checksum for detecting an error with respect to the ICMP header P213.

The message specific information field P213*d* may include a field value representing specific information about a corresponding packet fragment.

Figure 9:
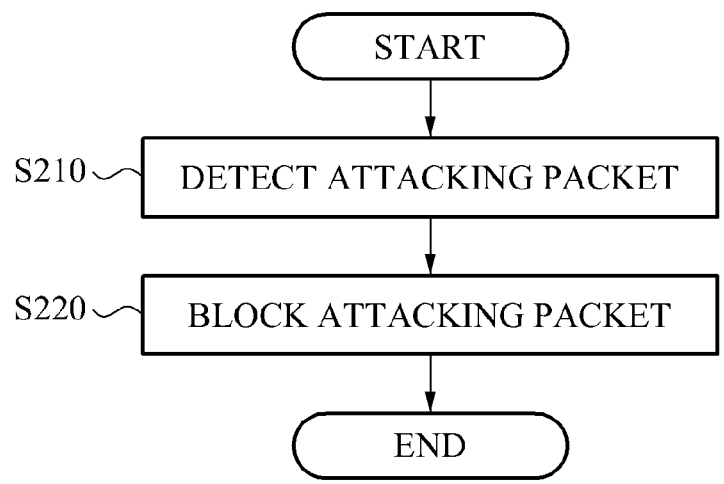
FIG. 9 is a diagram illustrating a method for blocking, by a server, a denial-of-service (DoS) according to the first embodiment of the present invention.
Figure 10:
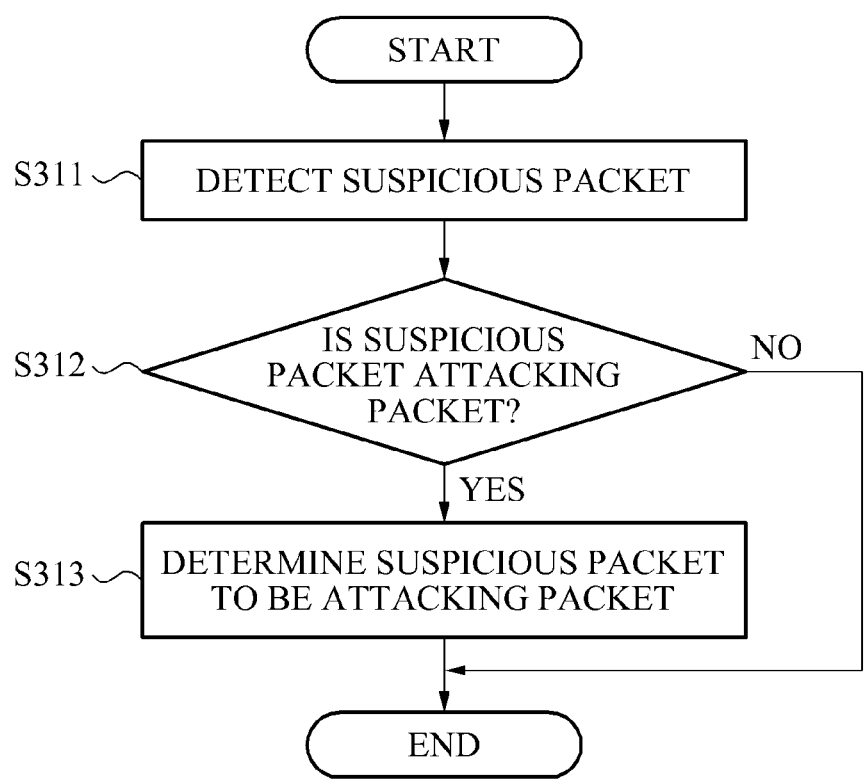
FIG. 10 is a diagram illustrating a method for detecting, by a server, an attacking packet according to an example of the first embodiment of the present invention.
Figure 11:
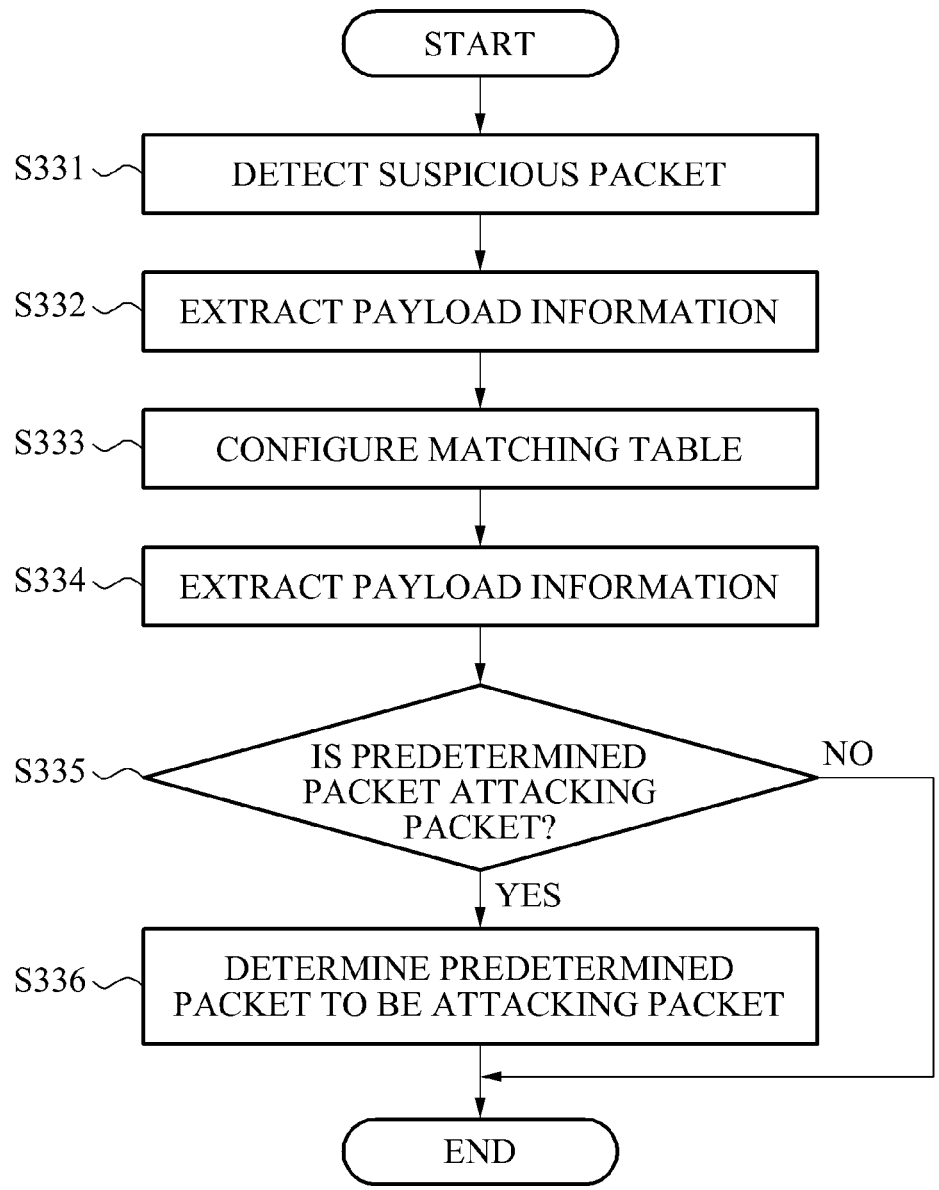
FIG. 11 is a diagram illustrating a method for detecting, by a server, an attacking packet according to another example of the first embodiment of the present invention.

Referring to FIGS. 9 to 11, a method for blocking a DoS attack through a server detecting or block an attacking packet according to a first embodiment of the present invention will be discussed.

FIG. 9 is a diagram illustrating a method for blocking a DoS by a server according to a first embodiment of the present invention.

As shown in FIG. 9, in operation S210, the server 200 may detect an attacking packet from among a plurality of packets received, using header information and a payload of the plurality of packets received. Here, the plurality of packets received may include a plurality of ICMP packets.

In operation S220, the server 200 may block the attacking packet detected.

FIG. 10 is a diagram illustrating a method for detecting an attacking packet by a server according to an example of the first embodiment of the present invention.

As shown in FIG. 10, in operation S311, the server 200 may detect a suspicious packet suspected to be an attacking packet from among the plurality of packets received, using header information of a plurality of packets received, for example, protocol information, fragmentation characteristic information, and fragmentation location information. Here, the server 200 may extract the header information, using respective field values of a protocol identification field, a flags field, and a fragment offset field included in an IP header. In this instance, the server 200 may determine a packet of which the field value of the protocol identification field is "0x01", the field value of the flags field is "0x2", and the field value of the fragment offset field is "0" to be a suspicious packet.

In operation S312, the server 200 may determine whether the suspicious packet is an attacking packet, using a payload included in the suspicious packet detected.

In operation S313, the server 200 may determine the suspicious packet to be an attacking packet when the payload included in the suspicious packet is configured by identical characters.

As such, according to FIG. 10, an attacking traffic in which a payload of an unfragmented ICMP packet is configured by identical characters.

FIG. 11 is a diagram illustrating a method for detecting an attacking packet by a server according to another example of the first embodiment of the present invention.

As shown in FIG. 11, in operation S331, the server 200 may detect a suspicious packet suspected to be an attacking packet from among a plurality of packets received, using header information of the plurality of packets received, for example, protocol information, fragmentation characteristics information, and fragmentation location information. Here, the server 200 may extract the header information, using respective field values of a protocol identification field, a flags field, and a fragment offset field included in an IP header. In this instance, the server 200 may determine a packet of which the field value of the protocol identification field is "0x01", the field value of the flags field is "0x2", and the field value of the fragment offset field is "0" to be a suspicious packet.

In operation S332, the server 200 may extract payload information, hereinafter referred to as "first payload information" about a suspicious packet, using a payload included in the suspicious packet detected. Here, the first payload information may include length information of a payload and a hash value of the payload with respect to the payload included in the suspicious packet. In this instance, the server 200 may generate the hash value of the payload, through applying the payload to a hash function.

In operation S333, the server 200 may configure a payload matching table, through storing the extracted first payload information in the payload matching table.

In operation S334, the server 200 may extract payload information about a predetermined packet subsequently received, hereinafter referred to as "second payload information".

In operation S335, the server 200 may determine whether a predetermined packet is an attacking packet, through comparing the first payload information and the second information stored in the payload matching table.

In operation S336, when the first payload information is identical to the second payload information, the server 200 may determine the predetermined packet to be an attacking packet.

As such, according to FIG. 11, an attacking traffic in which an ICMP packet having an identical payload character string is repeated may be detected.

Figure 12:
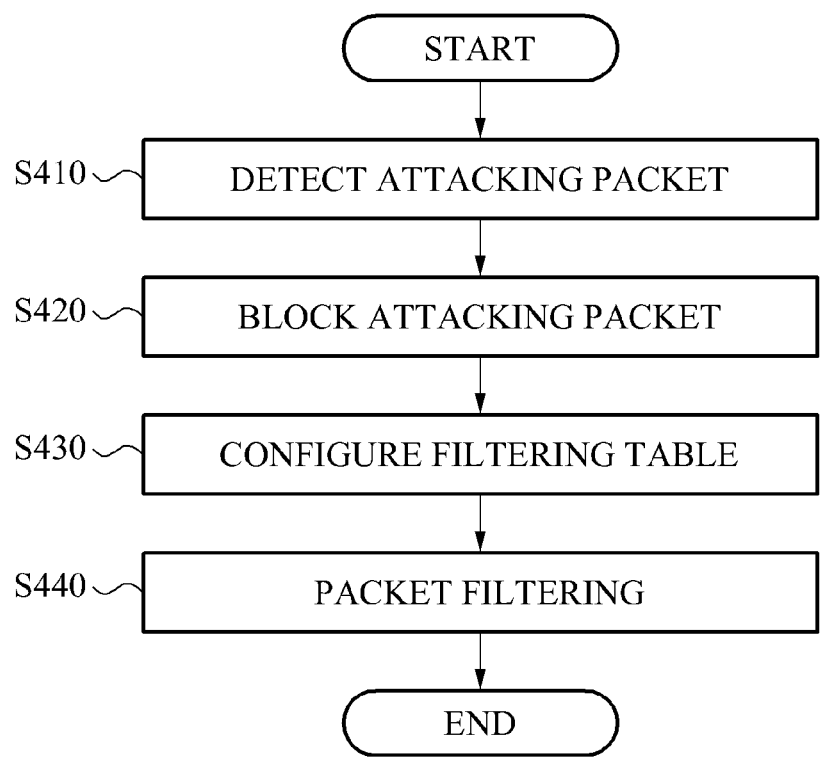
FIG. 12 is a diagram illustrating a method for blocking, by a server, a DoS attack according to a second embodiment of the present invention.
Figure 13:
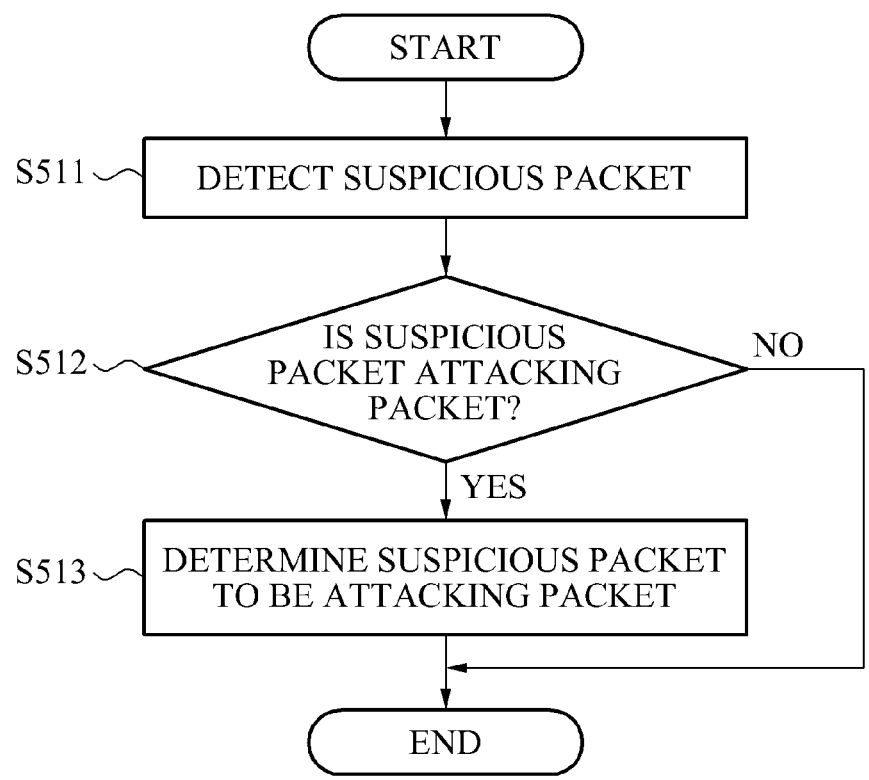
FIG. 13 is a diagram illustrating a method for detecting, by a server, an attacking packet according to an example of the second embodiment of the present invention.
Figure 14:
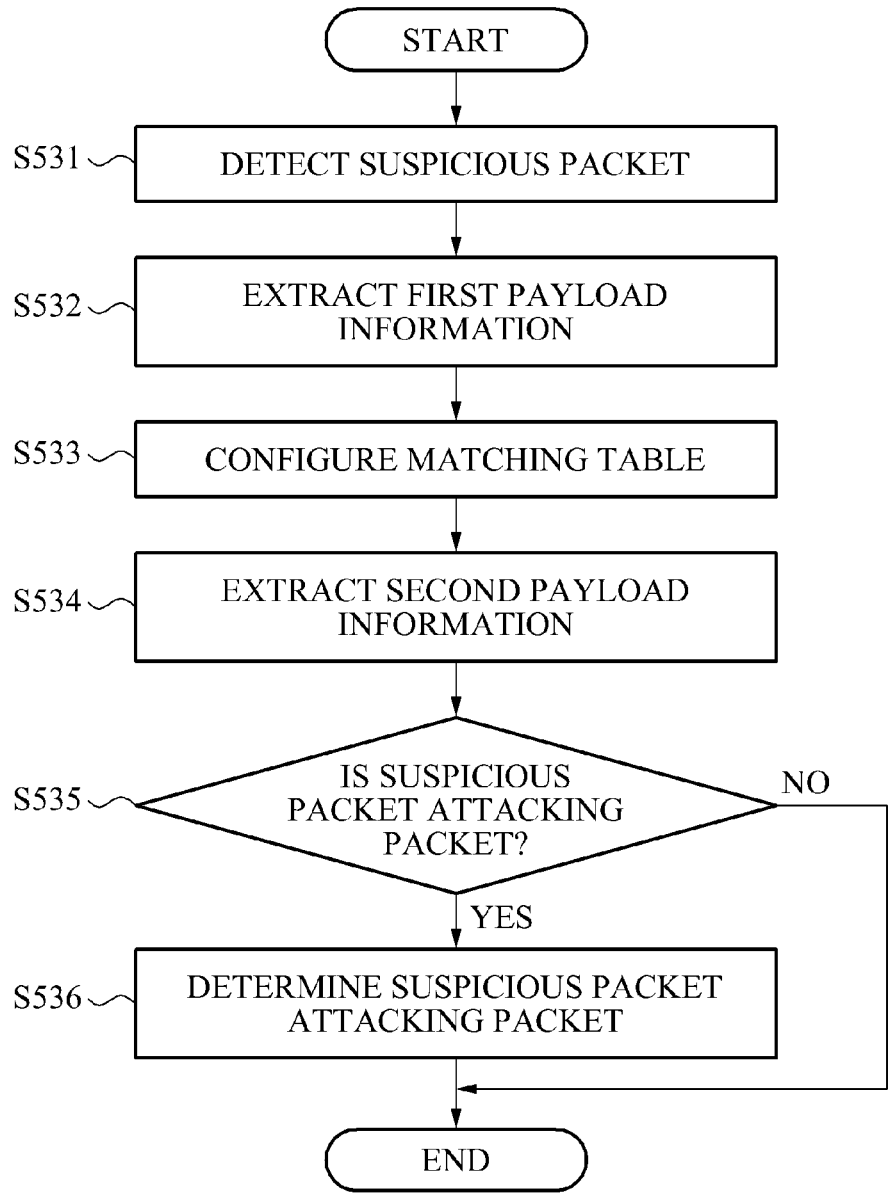
FIG. 14 is a diagram illustrating a method for detecting, by a server, an attacking packet according to another example of the second embodiment of the present invention.

Referring to FIGS. 12 to 14, a method for blocking a DoS attack through a server detecting and blocking an attacking packet according to a second embodiment of the present invention will be described.

FIG. 12 is a diagram illustrating a method for blocking a DoS attack by a server according to a second embodiment of the present invention.

As shown in FIG. 12, in operation S410, the server 200 may detect an attacking packet from among a plurality of packets received, using header information and a payload with respect to the plurality of packets received. Here, the plurality of packets received may include a plurality of ICMP packet fragments.

In operation S420, the server 200 may block the attacking packet detected.

In operation S430, the server 200 may configure a filtering table through storing IP identification information of the blocked attacking packet in a filtering table. Here, the server 200 may extract the IP identification information, using a field value of an IP identification field included in an IP header of the attacking packet.

In operation S440, the server 200 may perform packet filtering, using the filtering table. Here, the server 200 may block a packet including IP identification information identical to the IP identification information stored in the filtering table.

FIG. 13 is a diagram illustrating a method for detecting an attacking packet by a server according to an example of the second embodiment of the present invention.

As shown in FIG. 13, in operation S511, the server 200 may detect a suspicious packet from among a plurality of packets received, using header information of the plurality of packets received, for example, protocol information and fragmentation characteristics information. Here, the server 200 may extract the header information using respective field values of a protocol identification field and a flags field included in an IP header. In this instance, the server 200 may determine a packet of which the field value of the protocol identification field is "0x01" and the field value of the flags field is "0x1" to be a suspicious packet.

In operation S512, the server 200 may determine whether the suspicious packet is an attacking packet, using a payload included in the suspicious packet detected.

In operation S513, when the payload included in the suspicious packet is configured by identical characters, the server 200 may determine the suspicious packet to be an attacking packet.

As such, according to FIG. 13, an attacking traffic in which a payload of fragmented ICMP packet fragments is configured by identical characters may be detected.

FIG. 14 is a diagram illustrating a method for detecting an attacking packet by a server according to another example of the second embodiment of the present invention.

As shown in FIG. 14, in operation S531, the server 200 may detect a suspicious packet suspected to be an attacking packet from among a plurality of packets received, using header information of the plurality of packets received, for example, protocol information, fragmentation characteristic information, and fragmentation location information. Here, the server 200 may extract the header information, using respective field values of a protocol identification field, a flags field, and a fragment offset field included in an IP header. In this instance, the server 200 may determine a packet of which the field value of the protocol identification field is "0x01", the field value of the flags field is "0x1", and the field value of the fragment offset field is "0" to be a suspicious packet.

In operation S532, the server 200 may extract payload information about a suspicious packet, hereinafter referred to as "first payload information", using the payload included in the suspicious packet detected. Here, the first payload information may include length information of the payload and a hash value of the payload with respect to the payload included in the suspicious packet. In this instance, the server 200 may generate the hash value of the payload by applying the payload to a hash function.

In operation S533, the server 200 may configure a payload matching table through storing the extracted first payload information in the payload matching table.

In operation S534, the server 200 may extract payload information about a predetermined packet subsequently received, hereinafter referred to as "second payload information".

In operation S535, the server 200 may determine whether the predetermined packet is an attacking packet, through comparing the first payload information to the second payload information stored in the payload matching table.

In operation S536, when the first payload information is identical to the second payload information, the server 200 may determine the predetermined packet to be an attacking packet.

As such, according to FIG. 14, an attacking traffic in which an ICMP packet having an identical payload character string is repeated may be detected.

Figure 15:
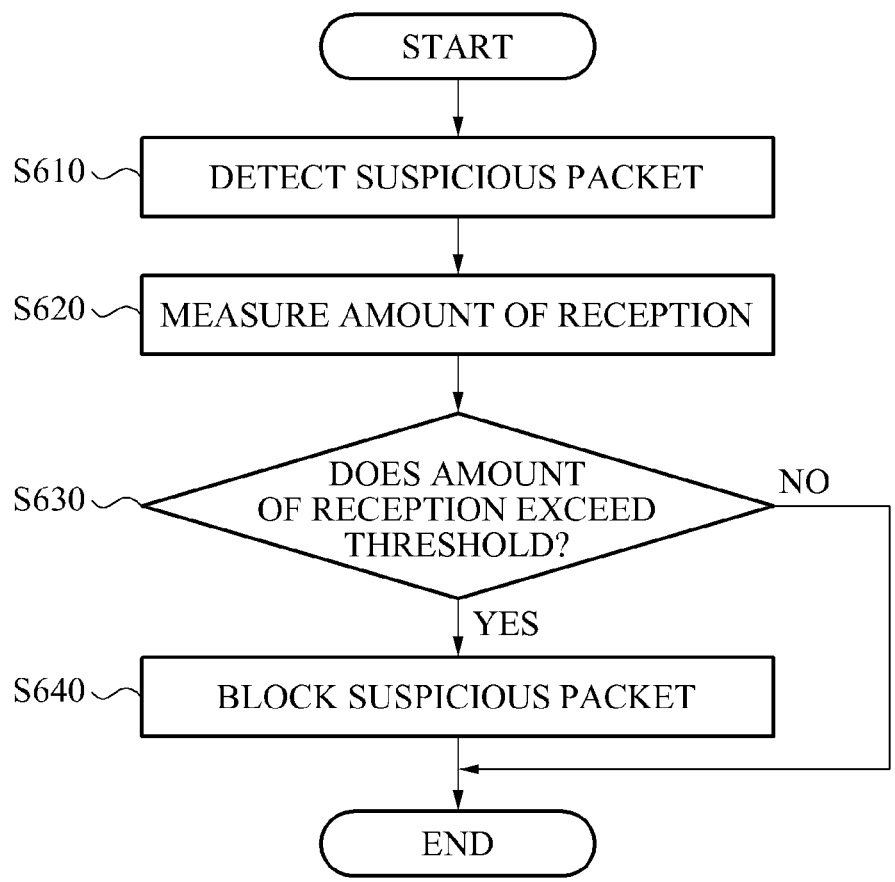
FIG. 15 is a diagram illustrating a method for blocking, by a server, a DoS attack according to a third embodiment of the present invention.

Referring to FIG. 15, a method for blocking a DoS attack through a server detecting and blocking an attacking packet according to a third embodiment of the present invention will be described.

FIG. 15 is a diagram illustrating a method for blocking a DoS attack by a server according to a third embodiment of the present invention.

As shown in FIG. 15, in operation S610, the server 200 may detect a suspicious packet from among a plurality of packets received, using header information of the to plurality of packets received, for example, protocol information and fragmentation characteristics information. Here, the server 200 may extract the header information using respective field values of a protocol identification field and a flags field included in an IP header. In this instance, the server 200 may determine a packet of which the field value of the protocol identification field is "0x01" and the field value of the flags field is "0x1" to be a suspicious packet.

In operation S620, the server 200 may measure a number of the suspicious packet received during a predetermined period of time. In this instance, the server 200 may measure a reception frequency of the suspicious packets.

In operation S630, the server 200 may determine whether the number of the suspicious packets received exceeds a threshold value, through comparing the number of packets received to a predetermined threshold value.

In operation S640, when the number of packets received exceeds the threshold value, the server 200 may block suspicious packets subsequently received.

As such, according to FIG. 15, an attacking traffic in which a predetermined rule in a payload of an ICMP packet is absent and unfragmented may be detected and blocked.

Figure 16:
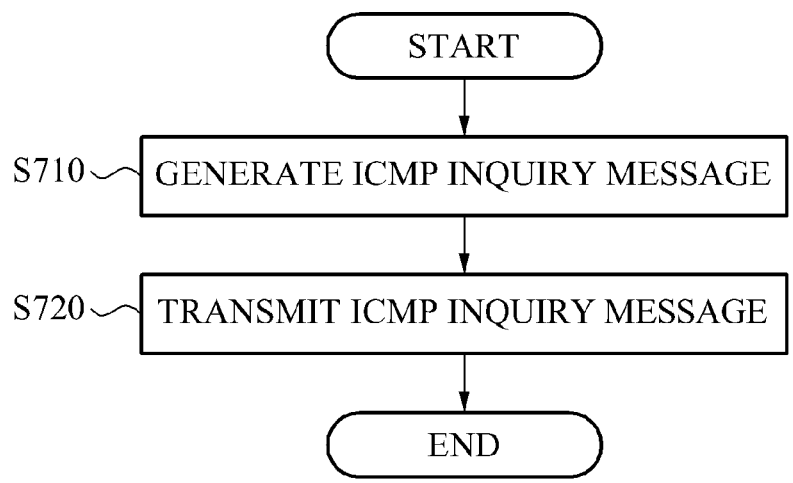
FIG. 16 is a diagram illustrating a method for transmitting an attacking packet according to the second embodiment of the present invention.

Referring to FIG. 16, a method for performing a DoS attack with respect to a server through a client transmitting an attacking packet to a server according to the second embodiment of the present invention will be described.

FIG. 16 is a diagram illustrating a method for transmitting an attacking packet according to the second embodiment of the present invention.

As shown in FIG. 16, in operation S710, the plurality of clients 100 may generate an ICMP inquiry message corresponding to an attacking packet for performing a DoS attack with respect to the server 200. Here, the ICMP inquiry message may include an IP header, an ICMP header, and a payload.

In operation S720, the plurality of clients 100 may transmit the generated ICMP inquiry message to the server 200.

Figure 17:
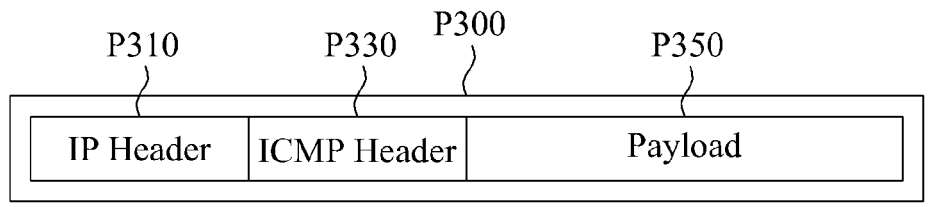
FIG. 17 is a diagram illustrating a structure of an ICMP inquiry message according to an embodiment of the present invention.
Figure 18:
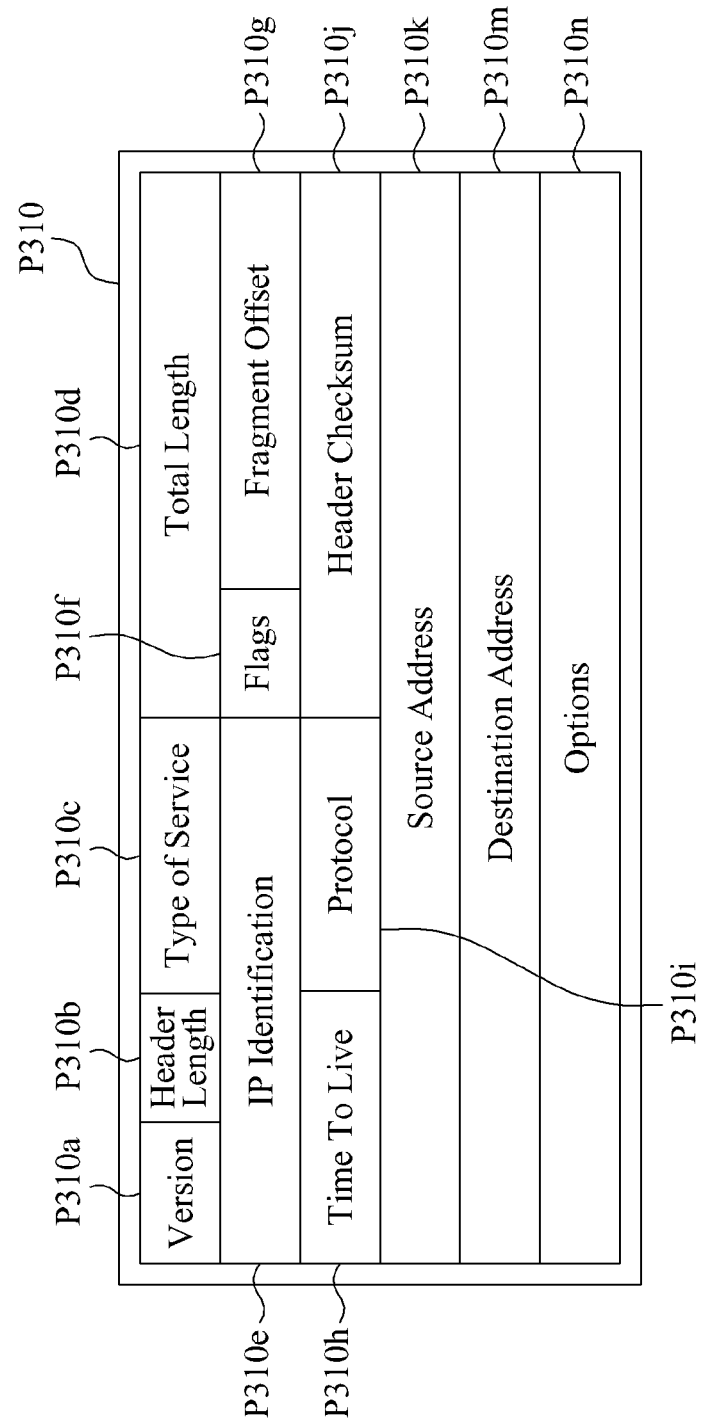
FIG. 18 is a diagram illustrating a structure of an IP header included in an ICMP inquiry message according to an embodiment of the present invention.
Figure 19:
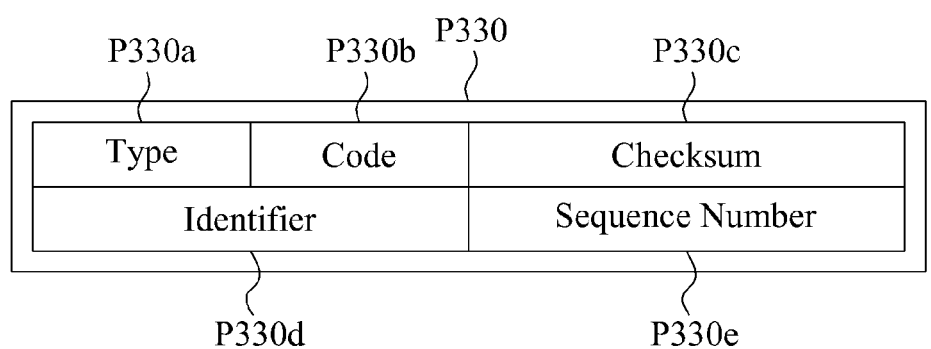
FIG. 19 is a diagram illustrating a structure of an ICMP header included in an to ICMP inquiry message according to an embodiment of the present invention.

Referring to FIGS. 17 through 19, an ICMP inquiry message according to an embodiment of the present invention will be described.

FIG. 17 is a diagram illustrating a structure of an ICMP inquiry message P300 according to an embodiment of the present invention.

As shown in FIG. 17, the ICMP inquiry message P300 may include an IP header P310, an ICMP header P330, and a payload P350.

The IP header P310 may include control information associated with an IP.

The ICMP header P330 may include control information associated with an ICMP.

The payload P350 may include data.

FIG. 18 is a diagram illustrating a structure of an IP header P310 included in an ICMP inquiry message according to an embodiment of the present invention.

As shown in FIG. 18, the IP header P310 may include an IP version field P310a, a header length field P310b, a type of service field P310c, a total length of packet field P310d, an IP identification field P310e, a flags field P310f, a fragment offset field P310g, a packet time to live field P310h, a protocol identification field P310i, a header checksum field P310j, a source address field P310k, a destination address field P310m, and an options field P310n.

The IP version field P310a may include a field value representing IP version information of a corresponding packet.

The header length field P310b may include a field value representing length information of the IP header P310.

The type of service field P310c may include a field value representing service quality information.

The total length of packet field P310d may include a field value representing length information of a corresponding packet.

The IP identification field P310e may include a field value representing IP identification information of a corresponding packet.

The flags field P310f may include a field value representing a fragmentation characteristic of a corresponding packet.

The fragment offset field P310g may include a field value representing a fragmentation location of a corresponding packet.

The packet time to live field P310h may include a field value representing a packet time to live for determining whether a corresponding packet is to be discarded.

The protocol identification field P310i may include a field value representing protocol information of a corresponding field. Here, the protocol identification field to P310i may include a field value, for example, "0x01", representing an ICMP.

The header checksum field P310j may include a field value representing a checksum for detecting an error with respect to the IP header P310.

The source address field P310k may include a field value representing an IP address of a source of a corresponding packet.

The destination address field P310m may include a field value representing an IP address of a destination of a corresponding packet.

The options field P310n may include a field value representing an option of the IP header P310.

FIG. 19 is a diagram illustrating a structure of an ICMP header P330 included in an ICMP inquiry message according to an embodiment of the present invention.

As shown in FIG. 19, the ICMP header P330 may include a type field P330a, a code field P330b, a checksum field P330c, an identifier field P330d, and a sequence number field P330e.

The type field P330a may include a field value representing message type information. In this instance, the type field P330a may include a field value, for example, "0x8", representing that a message type of a corresponding packet is an echo request. Also, the type field P330a may include a field value, for example, "0x0", representing that a message type of a corresponding packet is an echo reply.

The code field P330b may include a field value representing low-level information of the message type, based on the message type. Here, when the message type of a corresponding packet is an echo request or an echo reply, the code field P330b may include a field value of "0x0".

The checksum field P330c may include a field value representing a checksum for detecting an error with respect to the ICMP header P330.

The identifier field P330d may include a field value representing message identification information about an ICMP inquiry message. In this instance, the ICMP inquiry message may be classified into an echo request message and an echo reply message, based on message type information, and a field value of the identifier field P330d of the echo request message may be identical to a field value of the identifier field P330d of the echo reply message.

The sequence number field P330e may include a field value representing sequence information of the ICMP inquiry message.

Referring to FIGS. 20 through 23, a method for blocking a DoS attack through a server detecting and blocking an attacking packet according to a fourth embodiment of the present invention will be described.

Figure 20:
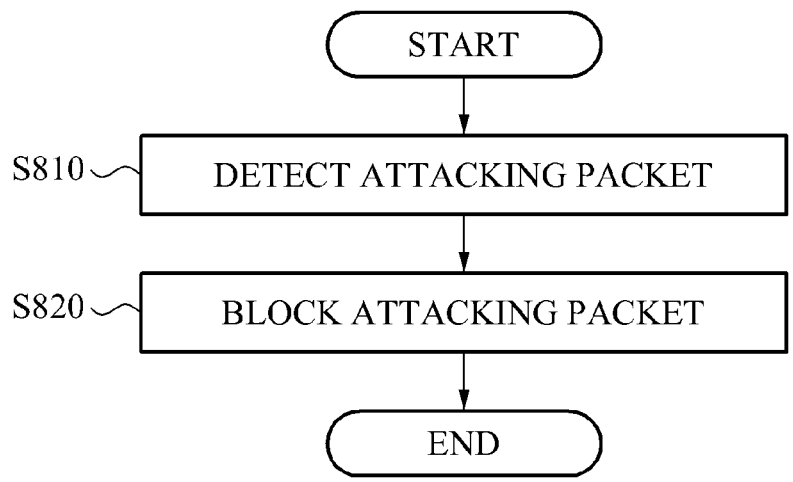
FIG. 20 is a diagram illustrating a method for blocking, by a server, a DoS attack according to a fourth embodiment of the present invention.

FIG. 20 is a diagram illustrating a method for blocking a DoS attack by a server according to a fourth embodiment of the present invention.

As shown in FIG. 20, in operation S810, the server 200 may detect an attacking packet from among a plurality of packets received, using header information of the plurality of packets received. Here, the plurality of packets received may include a plurality of ICMP inquiry messages.

In operation S820, the server 200 may block the attacking packet detected.

Figure 21:
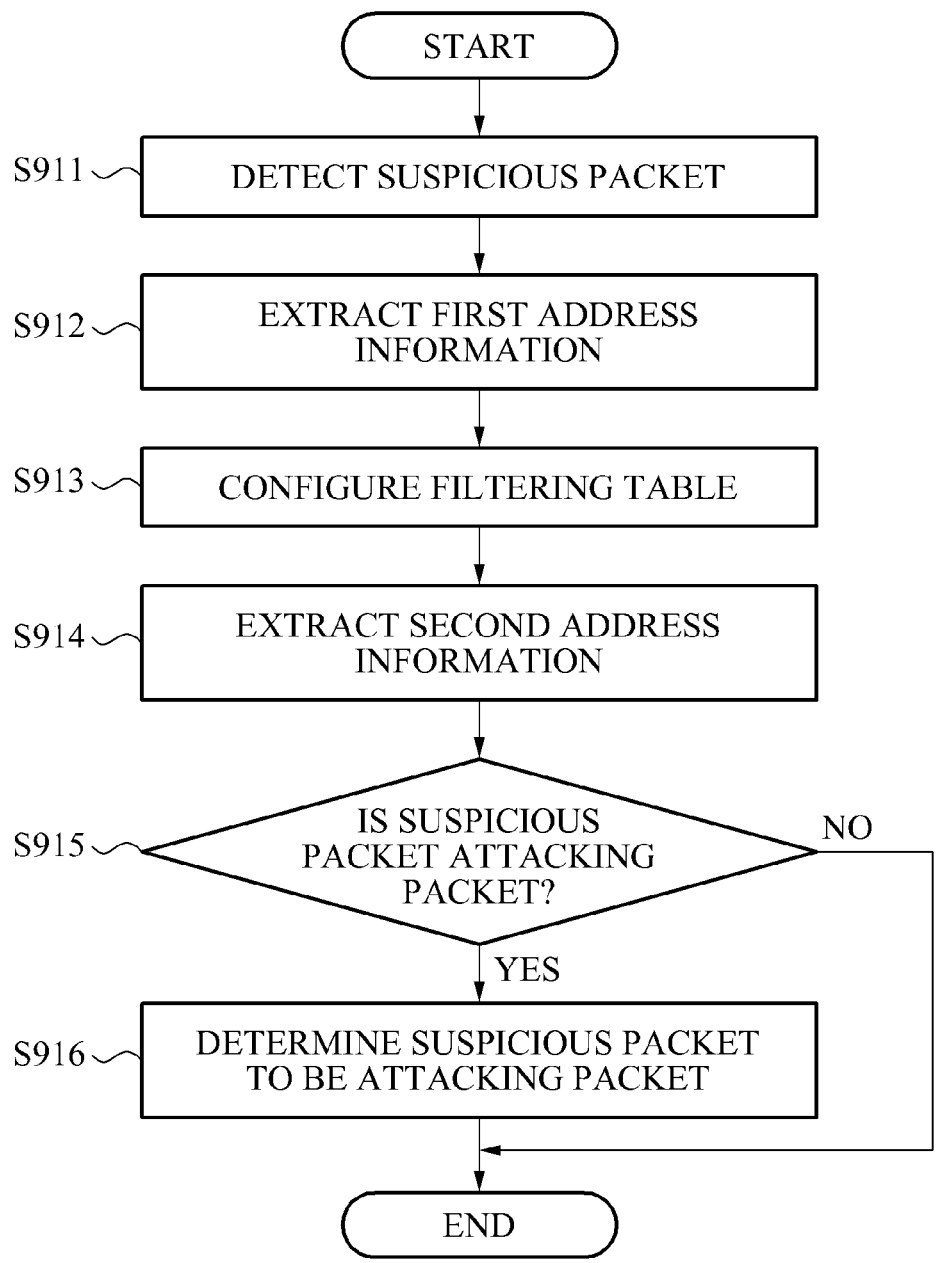
FIG. 21 is a diagram illustrating a method for detecting, by a server, an attacking packet according to an example of the fourth embodiment of the present invention.

FIG. 21 is a diagram illustrating a method for detecting an attacking packet by a server according to an example of the fourth embodiment of the present invention.

As shown in FIG. 21, in operation S911, the server 200 may detect a suspicious packet from among a plurality of packets received, using header information of the plurality of packets received, for example, protocol information, message type information, and low-level information of a message type. Here, the server 200 may extract the header information, using respective field values of a type field and a code field included in an ICMP header. In this instance, the server 200 may determine a packet of which the field value of the protocol identification field is "0x01", the field value of the type field is "0x8", and the field value of the code field is "0x0" to be a suspicious packet.

In operation S912, the server 200 may extract address information, hereinafter referred to as "first address information", about the suspicious packet detected. Here, the address information extracted may include a source IP address and a destination IP address of the suspicious packet.

In operation S913, the server 200 may configure a filtering table through storing first address information in the filtering table.

In operation S914, the server 200 may extract address information, hereinafter referred to as "second address information", about a predetermined ICMP inquiry message subsequently received. Here, the predetermined ICMP inquiry message may refer to an echo request message of which a field value of the protocol identification field is "0x01", a field value of the type field is "0x8", and a field value of the code field is "0x0".

In operation S915, the server 200 may determine whether the ICMP inquiry message received is an attacking packet, through comparing the first address information and the second address information stored in the filtering table.

In operation S916, when the second address information is identical to the first address information included in an untransmitted echo reply message, the server 200 may determine the predetermined ICMP inquiry message to be an attacking packet.

As such, according to FIG. 21, an attacking traffic attempting an ICMP echo request flooding attack or a Ping flooding attack may be detected.

Figure 22:
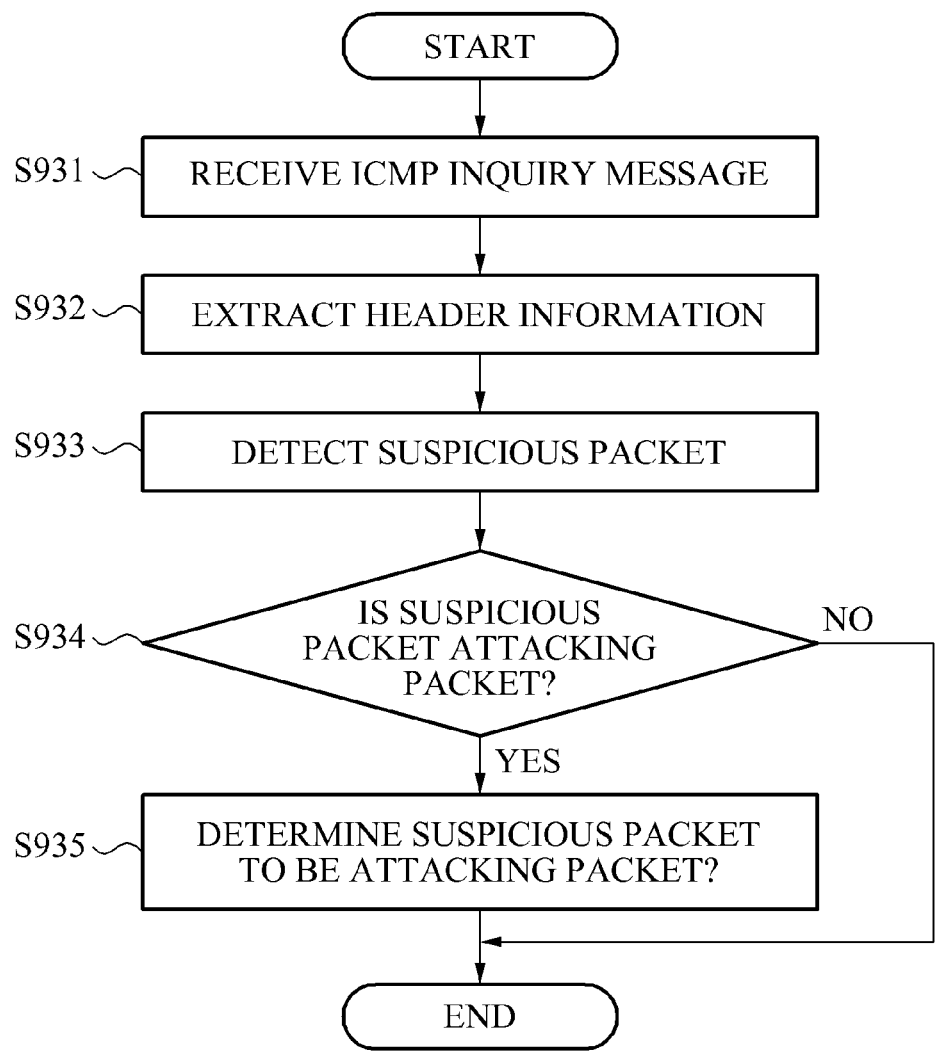
FIG. 22 is a diagram illustrating a method for detecting, by a server, an attacking packet according to another example of the fourth embodiment of the present invention.

FIG. 22 is a diagram illustrating a method for detecting an attacking packet by a server according to another example of the fourth embodiment of the present invention.

As shown in FIG. 22, in operation S931, the server 200 may receive an ICMP inquiry message. Here, the ICMP inquiry message may refer to an echo request message of which a field value of a protocol identification field is "0x01", a field value of a type field is "0x8", and a field value of a code field is "0x0".

In operation S932, the server 200 may extract header information from the ICMP inquiry message received. Here, the header information extracted may include a destination IP address, message identification information, and sequence information of the ICMP inquiry message. In this instance, the server 200 may extract the header information, using respective field values of a destination address field included in an IP header, an identification field and a sequence number field included in the ICMP header.

In operation S933, the server 200 may detect a suspicious packet corresponding to the header information extracted from the plurality of packets received. Here, the header information of the suspicious packet detected may be identical to the header information of the ICMP inquiry message.

In operation S934, the server 200 may determine whether the suspicious packet is an attacking packet, through comparing a reception time difference between the ICMP inquiry message and the suspicious packet to a predetermined reference time. Here, the reception difference time may refer to a difference between a point of time at which the ICMP inquiry message is received and a point of time at which the suspicious packet is received.

In operation S935, when the reception time difference is within the reference time, the server 200 may determine the suspicious packet to be an attacking packet. Here, the server 200 may also determine the ICMP inquiry message to be an attacking packet. For example, when the reception time difference between the ICMP inquiry message and the suspicious packet is within a second, the suspicious packet may be determined to be an attacking packet.

As such, according to FIG. 22, an attacking traffic of which message identification information and sequence information is identical to identification information and sequence information of a repeated ICMP inquiry message respectively may be detected.

Figure 23:
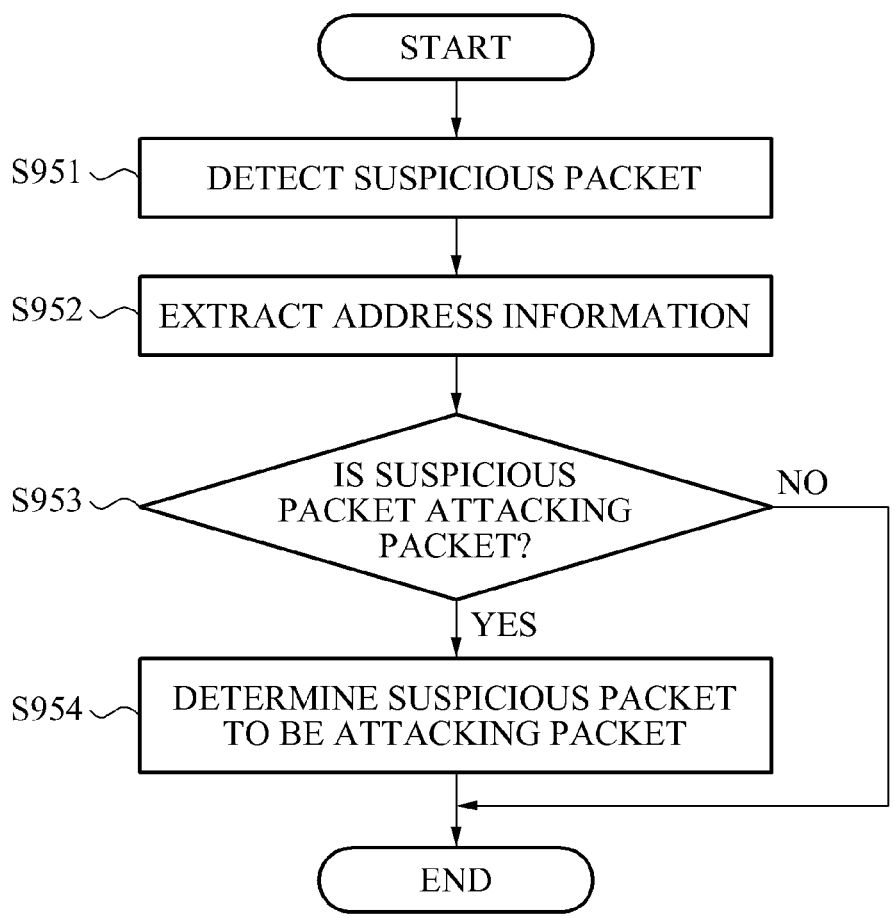
FIG. 23 is a diagram illustrating a method for detecting, by a server, a DoS attack according to still another example of the fourth embodiment of the present invention.

FIG. 23 is a diagram illustrating a method for detecting a DoS attack by a server according to still another example of the fourth embodiment of the present invention.

As shown in FIG. 23, in operation S911, the server 200 may detect a suspicious packet from among a plurality of packets received, using header information of the plurality of packets received, for example, protocol information, message type information, and low-level information of a message type. Here, the server 200 may extract the header information, using respective field values of a protocol identification field included in an IP header, a type field and a code field included in an ICMP header. In this instance, the server 200 may determine a packet, for example, an echo reply message, of which the field value of the protocol identification field is "0x01", the field value of the type field is "0x0", and the field value of the code field is "0x0" to be a suspicious packet.

In operation S952, the server 200 may extract address information of the suspicious packet detected. Here, the address information extracted may include a source IP address and a destination IP address of the suspicious packet.

In operation S953, the server 200 may determine whether the suspicious packet is an attacking packet, through comparing the address information extracted to the pre-stored filtering table. The filtering table may store address information of an echo request message transmitted.

In operation S954, when the address information extracted is not stored in the filtering table, the server 200 may determine the suspicious packet to be an attacking packet.

As such, according to FIG. 23, an attacking traffic in a form in which an echo reply message is in congestion, without an echo request message to an attacking target server, may be detected.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for blocking a denial-of-service (DoS) attack by a server that blocks an attacking packet, using an Internet control message protocol (ICMP), the method comprising:
   receiving a first echo request message that is classified to be one of an ICMP inquiry message;
   extracting filtering information from header information of the received first echo request message;
   receiving a second echo request message that is classified to be another of the ICMP inquiry message; and
   comparing header information of the second echo request message to the filtering information, and determining whether the received second echo request message is an attacking packet, including
      determining the second echo request message to be a suspicious packet when the header information of the second echo request message corresponds to the filtering information, and
      determining the suspicious packet to be the attacking packet when the second echo request message is received prior to a reply message being transmitted in response to the first echo request message.

2. The method of claim 1, wherein the filtering information comprises:
   origin address information and destination address information included in the header information of the first echo request message.

3. A method for blocking a denial-of-service (DoS) attack by a server that blocks an attacking packet, using an Internet control message protocol (ICMP), the method comprising:
   receiving a first echo request message that is classified to be one of an ICMP inquiry message;
   extracting filtering information from header information of the received first echo request message;
   receiving a second echo request message that is classified to be another of the ICMP inquiry message; and
   comparing header information of the second echo request message to the filtering information, and determining whether the received second echo request message is an attacking packet,
   wherein the determining of whether the received second echo request message is the attacking packet comprises:
      determining the second echo request message to be a suspicious packet when the header information of the second echo request message corresponds to the filtering information; and
      determining the second echo request message to be the attacking packet when a difference between a point of time for receiving the first echo request message and a point of time for receiving the second echo request message is within a reference time.

4. The method of claim 3, wherein the determining of the second echo request message to be the attacking packet comprises: determining the first echo request message to be an attacking packet.

5. The method of claim 3, wherein the filtering information comprises: destination address information included in the header information of the first echo request message, message ID information, and sequence information.

6. A method for blocking a denial-of-service attack by a server that blocks an attacking packet, using an Internet control message protocol (ICMP), the method comprising:
   extracting a suspicious packet from among a plurality of packets, using header information of the plurality of packets received;
   extracting filtering information from header information of the suspicious packet;
   receiving a message that is classified to be one of an ICMP inquiry message; and
   comparing the filtering information to header information of the message, and determining whether the message is an attacking packet, including comparing a point of time for transmitting a reply packet in response to the suspicious packet to a point of time for receiving the message when the header information of the message corresponds to the filtering information, and determining the message to be the attacking packet when the point of time for receiving the message is prior to the point of time for the reply packet to be transmitted.

7. The method of claim 6, wherein the extracting of the suspicious packet comprises: extracting the suspicious packet from among the plurality of packets, using protocol information and message type information of the plurality of packets.

8. The method of claim 7, wherein the extracting of the filtering information comprises: extracting filtering information including origin address information and destination address information from the header information of the suspicious packet.

9. The method of claim 7, wherein the suspicious packet is the ICMP inquiry message.

* * * * *